Feb. 24, 1942. M. L. KAPLAN 2,273,965
METHOD OF MAKING COLLARS
Filed April 17, 1939
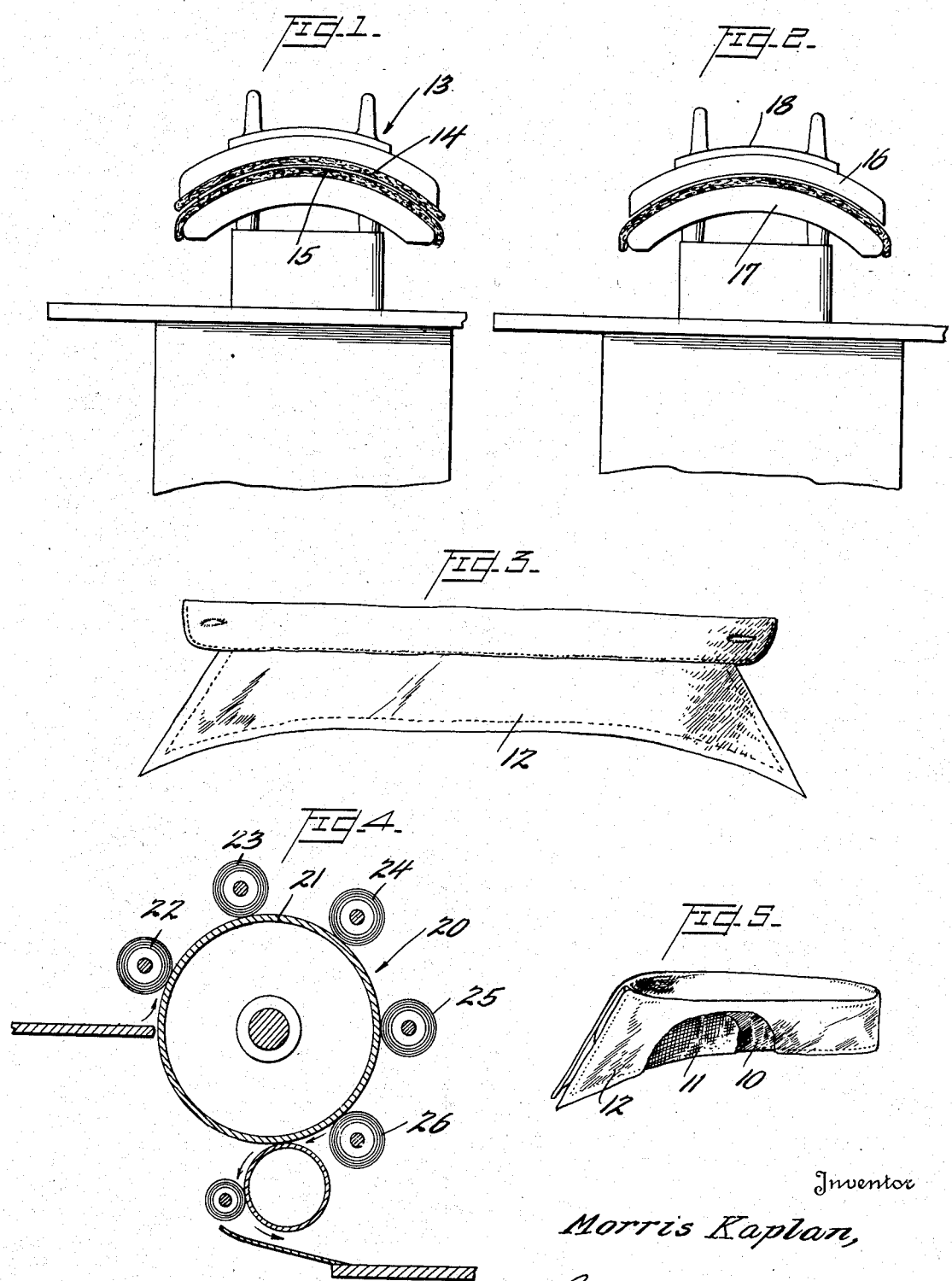

UNITED STATES PATENT OFFICE 2,273,965

METHOD OF MAKING COLLARS

Morris L. Kaplan, Hazleton, Pa., assignor, by mesne assignments, to Celanese Corporation of America Application April 17, 1939, Serial No. 268,391

1 Claim. (Cl. 154—2)

The present invention relates to a new and improved method of making semi-stiff collars, such as those known in the trade as "fused" collars. The invention, of course, is not confined to the manufacture of collars, since its advantages apply equally in making many other fabric garment parts.

Collars of the semi-stiff, fused class comprise, generally speaking, inner and outer plies and an interliner, all united by a thermoplastic adhesive material serving as a stiffening medium for the fabric plies. According to a well known commercial method, the adhesive, stiffening material is supplied in the form of thermoplastic threads woven in the interliner, in spaced lattice relation. In the manufacturing operation, two fabric plies of shirting material and a ply of interliner are superimposed and then stitched along the bottom and the ends, leaving the top edge open, whereupon they are hand-turned, as in the usual method of making hand-turned soft collars. The turned blanks are then subjected to heat and pressure, to soften the filaments or fibres of the thermoplastic threads, to unite the plies together and to form the plies into a composite sheet in which the melted or softened fibres or filaments are adhesively united to the fibres of the non-thermoplastic threads. The thermoplastic material, upon cooling, imparts a certain degree of stiffness to the composite sheet and, in this way, a semi-stiff collar is formed.

In commercial, prior art methods, cellulose derivative materials have been used as the thermoplastic adhesive and stiffening medium, such as cellulose acetate, cellulose nitrate, ethyl-cellulose, methyl-cellulose or benzyl-cellulose. In order to enhance the thermoplastic characteristics of the materials, and to assist in the softening thereof, it has been proposed to treat the thermoplastic fibres with a plasticizer, softening agent or solvent for the cellulose derivative material. The use of such agents, however, has been simply a step auxiliary to the softening of the thermoplastic threads and the uniting of the plies by heat.

Fused collars made in accordance with such methods have certain inherent defects, and it is the primary object of the present invention to provide a method which eliminates those defects in the finished product. It has been found that, in laundering shirts having the prior art fused collars attached thereto, occasionally, in the ironing operation, the collars become folded or creased, through inadvertence. If they are ironed in that state, a crease is formed therein which, in subsequent laundering and ironing operations, cannot be removed. The appearance of the collar, of course, is substantially ruined by such a defect and the article is rendered worthless. I have discovered that this phenomenon is caused by the fact that the peptized cellulose derivative material in the collar is so brittle that, when it is creased and subjected to heat and pressure, it tends to crack physically, and in subsequent attempts to smooth the collar, the cracks cannot be repaired and the product cannot be restored to its original state.

It is my belief that the cellulose derivative material is rendered brittle by reason of the fact that, during the fusing operation, it is subjected to such an amount of heat that the plasticizer employed in the original cellulose derivative threads is removed, leaving the material in a stiff, brittle state, characterized by the absence of the plasticizer.

In the conventional methods of making fused collars, wherein heat is used with pressure to unite the plies, the collars rendered so brittle that, before they can be sewed to the shirt, it is necessary to dip them in water, to make them softer. Otherwise, the sewing operation is extremely difficult, and the collars often are cracked while being attached to the shirts. In accordance with the present method, the step of dipping the collars in water, prior to the sewing-on step, is entirely eliminated since the cellulose derivative interliner is not rendered brittle by the fusing operation.

A further defect in collars made by conventional methods is that the adhesive characteristics of the thermoplastic cellulose derivative threads are considerably lessened by the high degree of heat used to soften the fibres and to unite the plies. As a result, the several plies of the collar often become separated from one another, for instance, during a laundering operation, with the result that the stiffness of the collar is decreased and the outer ply tends to wrinkle or buckle, making the collar unsightly. The method of the present invention in no way detracts from the adhesive characteristics of the cellulose derivative material used to unite the plies together, and accurate tests indicate that a great deal more force is required to separate the plies when they have been united by the method of this invention. As a result, the plies do not become separated in a laundering operation or in normal use of the collars, and the disadvantages of prior art collars are entirely eliminated.

It is a primary object of the present invention to provide a method of producing a semi-stiff collar of the fused type, characterized by the absence of heat applied to render the cellulose derivative thermoplastic material soft, thereby avoiding the brittle characteristic which results from applied heat, while still utilizing that thermoplastic material for the normal stiffening and cementing function. I have discovered that, by applying a solvent for the cellulose derivative material to the plies and then subjecting the plies to pressure at room temperature, without the application of any heat or utilizing the thermoplastic characteristic of the material, a greatly improved product results, characterized by the absence of brittleness and by an increased adherence of the plies to each other.

The material used in accordance with the method of the present invention for uniting the plies and for imparting stiffness to the finished product is, like the material used in the prior methods, both thermoplastic and capable of being softened by chemical solvents. In the past, the well known thermoplastic characteristic of the material always was relied upon to render the material soft and adhesive. The obvious and natural manner of uniting the plies was to press them together into adhesive contact under the influence of heat to soften the thermoplastic material. The method of the present invention departs from the prior art methods by disregarding entirely the thermoplastic characteristics of the adhesive material and by utilizing, instead, the characteristic of the material which enables it to be softened and rendered adhesive by chemical solvents. I have discovered that, by relying solely upon the softening action of solvents, and entirely avoiding the use of heat, a greatly improved product may be produced.

In the accompanying drawing, I have illustrated, diagrammatically, the steps employed in the method.

In the drawing:

Figure 1 is a diagrammatic representation of the step of moistening the collar with a solvent.

Figure 2 is a similar representation of cold pressing step.

Figure 3 represents the fused collar after that step.

Figure 4 represents a cold ironing or rolling step, and

Figure 5 is an elevational view of a collar with certain portions of the top ply and the interliner broken away.

In carrying out the method, a collar blank of any approved type may be employed, so long as cellulose derivative material is associated therewith, for adhesively uniting the plies in the subsequent operations. Preferably, the blank is made up of hand-turned plies, comprising an inner ply 10 of shirting material, an interliner 11 and a top ply 12. The interliner is preferably woven from heavier threads, as in the usual practice. Certain threads, such as every third thread in the warp and filling, are made up of cellulose derivative fibres, such as Celanese or Acele. Any other suitable cellulose derivative material, such as cellulose acetates and cellulose nitrates may, of course, be employed.

The collar blank, after being hand-turned, is moistened with a suitable solvent for the cellulose derivative fibres, such as acetone, U. S. industrial alcohol S. 139 (75% acetone—25% methanol) or commercial solvents No. 75. The dampening may be accomplished by spraying the blanks, by dipping them in the solvent, or by pressing the blanks between pads maintained wet with the solvent. In Figure 1, a wet press 13 is diagrammatically illustrated. The top and bottom pads 14, 15 are maintained moist by the flow of solvent from any suitable source, controlled by suitable means.

After the blank has been moistened in this manner, so that the cellulose derivative fibres are peptized, softened and rendered adhesive, the blank is placed in a press 16, having a padded buck 17 and a smooth metal head 18. The collar with the bottom or underneath ply disposed upwardly is then subjected to pressure at substantially room temperature for a period of about five seconds. The press is then opened and the collar reversed, so that the outer or top side of the same is disposed upwardly. It is again pressed for a period of about fifteen seconds, whereupon the three plies will be found to be fused together.

Next, the collar is subjected to a rolling or cold ironing operation in a collar ironer 20, wherein no heat is used. The ironer is of the type known as "American ironing machine No. 3914," except that no steam is admitted to the rolls. This machine comprises a large metallic roll 21 and a plurality of smaller, padded rolls 22—26. The machine smooths and compacts the plies of the collar and assists in squeezing out, absorbing, or otherwise removing any excess solvent still remaining in the collar.

If necessary, or desirable, the collar can be permitted to dry at atmospheric temperatures, before it is attached to the shirt. The solvents employed are relatively volatile and no difficulty is encountered in removing them from the fused blanks.

When collars are made in accordance with the present, cold fusing method, it will be found that although they are stiffened sufficiently for the desired purposes, they are not rendered brittle. They may be sewed to the collar band of the shirt directly, and no water dipping or other moistening step is required as a preliminary to the sewing operation. Moreover, the collars have greater flexibility and will not become cracked or permanently creased, should they be folded inadvertently, during a subsequent laundering operation in the home or at a commercial laundry.

I claim:

The method of producing semi-stiff collars which comprises interposing between the inner and outer fabric plies of the collar, an interliner having cellulose derivative threads arranged in spaced relation therein, moistening the plies and the interliner with a solvent for said threads, pressing one face of the collar with a substantially cold, smooth metal plate, pressing the other face of the collar with a substantially cold, smooth metal plate, said pressings being effected while the collar is supported on a soft surface thereby to unite the plies together, and subjecting the collar to a rolling operation between rolls at room temperature to facilitate removal of the solvent.

MORRIS L. KAPLAN.